(12) United States Patent
De Backer (10) Patent No.: US 12,073,274 B2
(45) Date of Patent: Aug. 27, 2024

(54) METHOD, SYSTEM, AND APPARATUS FOR INSERTING RFID-INTEGRATED LABEL INTO GARMENT SEAM

(71) Applicant: Avery Dennison Retail Information Services LLC, Mentor, OH (US)

(72) Inventor: Mathieu De Backer, Grottammare (IT)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/904,424

(22) PCT Filed: Feb. 19, 2021

(86) PCT No.: PCT/US2021/018857
§ 371 (c)(1),
(2) Date: Aug. 17, 2022

(87) PCT Pub. No.: WO2021/168307
PCT Pub. Date: Aug. 26, 2021

(65) Prior Publication Data
US 2023/0084051 A1    Mar. 16, 2023

Related U.S. Application Data

(60) Provisional application No. 62/978,483, filed on Feb. 19, 2020.

(51) Int. Cl.
*G06K 19/077*    (2006.01)
(52) U.S. Cl.
CPC .............. *G06K 19/07758* (2013.01)
(58) Field of Classification Search
CPC .................................. G06K 19/07758
USPC ....................................................... 235/492
See application file for complete search history.

(56) References Cited

U.S. PATENT DOCUMENTS

| | | | | |
|---|---|---|---|---|
| 4,157,692 A | * | 6/1979 | Brocklehurst | D05B 35/066 271/23 |
| 4,635,574 A | * | 1/1987 | Fujita | D05B 25/00 112/155 |
| 5,375,545 A | | 12/1994 | Adamski, Jr. et al. | |

(Continued)

FOREIGN PATENT DOCUMENTS

| DE | 4218141 | 12/1992 |
|---|---|---|
| DE | 29622334 U1 | 2/1997 |

(Continued)

OTHER PUBLICATIONS

Third Party Observations submitted by Emmanuel Huyghe on Sep. 24, 2021 in IA No. PCT/US2021/018857 filed Feb. 19, 2021.

(Continued)

*Primary Examiner* — Allyson N Trail (57) ABSTRACT

A method, system, and apparatus for inserting a woven label with integrated radio frequency identification (RFID) capabilities into a garment seam is shown and described. In exemplary embodiments, a woven RFID label is inserted into a garment seam during stitching. For example, the woven RFID label is automatically inserted using an overlock machine adapted to include a guide system. The guide system is configured to insert and encode the RFID tag incorporated in the woven label device during a stitching process.

17 Claims, 4 Drawing Sheets

(56) References Cited

U.S. PATENT DOCUMENTS

| | | | |
|---|---|---|---|
| 5,390,614 A * | 2/1995 | Adamski, Jr | D05B 3/20 |
| | | | 112/155 |
| 10,783,424 B1 * | 9/2020 | Trivelpiece | G06K 19/07756 |
| 2006/0065739 A1 | 3/2006 | Falls et al. | |
| 2010/0035027 A1 * | 2/2010 | Hill | G09F 21/02 |
| | | | 156/60 |
| 2011/0114734 A1 | 5/2011 | Tiedmann et al. | |
| 2011/0303751 A1 * | 12/2011 | Lai | G06K 19/07758 |
| | | | 112/475.08 |
| 2014/0152507 A1 * | 6/2014 | McAllister | G06K 7/10376 |
| | | | 342/126 |
| 2020/0193261 A1 | 6/2020 | De Backer | |
| 2022/0318532 A1 * | 10/2022 | Roth | G06K 7/0008 |
| 2023/0097855 A1 * | 3/2023 | Carteaux | H01Q 7/00 |
| | | | 235/492 |

FOREIGN PATENT DOCUMENTS

| | | |
|---|---|---|
| EP | 2362960 | 3/2014 |
| JP | 4-272201 | 9/1992 |
| WO | 2019/170952 | 9/2019 |
| WO | 2021/089939 | 5/2021 |

OTHER PUBLICATIONS

Third Party Observations submitted by Philippe Prugneau on Apr. 14, 2022 in IA No. PCT/US2021/018857 filed Feb. 19, 2021.

Sette, "E-Thread: Embed Primo1D's RFID Yarn in Products to Boost Assets' Digitalization," Presented at IDTechEx, Santa Clara 2019 Conference, Nov. 29, 2019. https://www.idtechex.com/usa2019/show/en/speakers/13830/e-thread-embed-primo1ds-rfid-yarn-in-products-to-boost-assets-digitalization.

International Preliminary Report on Patentability dated Aug. 23, 2022 issued in corresponding IA No. PCT/US2021/018857 filed Feb. 19, 2021.

International Search Report and Written Opinion dated Jun. 9, 2021 issued in corresponding IA No. PCT/US2021/018857 filed Feb. 19, 2021.

* cited by examiner

METHOD, SYSTEM, AND APPARATUS FOR INSERTING RFID-INTEGRATED LABEL INTO GARMENT SEAM

CROSS-REFERENCE TO RELATED APPLICATION

The present application is a 371 of International Application No. PCT/US2021/018857, which was published in English on Aug. 26, 2021, and claims the benefit of U.S. Provisional Patent Application No. 62/978,483 filed Feb. 19, 2020, both of which are incorporated herein by reference in their entireties.

FIELD OF THE INVENTION

The present invention relates generally to RFID-integrated labels. More specifically, the present invention relates to RFID-integrated labels inserted into stitching, such as within a garment seam, and associated systems, apparatuses, and methods for performing the same.

BACKGROUND

Labels, such as woven labels, are provided on various types of apparel and wearable items in order to provide information about the product, such as brand, care instructions, and place of manufacture, along with other information. In order to make woven labels more durable and more functional, the labels can include a polyethylene terephthalate (PET) inlay. The PET or Poly Propylene inlay provides an additional stiffness to the woven label, but can also cause discomfort to the wearer. For example, on a traditional shirt, the woven label will often be disposed on the inside of the shirt at or about the neck level of the wearer. A woven label with a PET inlay can cause discomfort to the wearer, for example, by rubbing against the skin. In addition, the PET inlay can be problematic with respect to recycling or reclaiming the fabric used in the garment as it may need to be removed prior to recycling.

However, due to the size of labels used with apparel, there is limited space to provide product information. Furthermore, it is undesirable to include additional labels on the inside portions of apparel due to concerns related to comfort of the wearer and it is not desired to include labels on exterior portions of apparel due to appearance concerns as the labels can add bulk. Thus, traditional woven labels offer minimal space to provide a consumer, shipper, or distributer with product information.

Accordingly, there is a need for a label capable of providing information about the product to which it is attached that is durable, functional, and causes minimal discomfort to a wearer or user of the product.

SUMMARY

To address the shortcomings of conventional labels, a label having a wireless communication device attached thereto is provided and inserted into stitching, such as within a garment seam, during stitching.

In some embodiments, a system for inserting a wireless communication device into stitching may include an overlock machine, and a guide system configured to feed at least one label into an edge region being of one or more layers of material being stitched by the overlock machine. The label may include a wireless communication device.

The guide system may include a channel for supporting at least one label, each label may include a wireless communication device. The guide system may include means for supporting a roll of labels, and the means for supporting may include a pin, rod, or bar. The guide system may include means for separating individual labels from other labels. The guide system may include means for supporting a stack of labels and the means for supporting may include a tray. The system may include an RFID encoder. The RFID encoder may be part of an encoding station located on the guide system. The system may include processing means and one or more databases.

In some embodiments, a method for inserting a wireless communication device into a seam may include placing a label along an edge of one or more layers of fabric. The label may include a wireless communication device, and the method may include using an overlocking machine to stitch along the edge and to create a seam binding the label to the material. The label may be one of a plurality of labels contained on a roll of labels and the placing step may include advancing a leading label of the plurality of labels from the roll of labels for placement along the edge. The method may include separating the leading label from the roll of labels. The label may be one of a plurality of labels contained in a stack of labels and the placing step may include advancing a leading label of the plurality of labels from the stack of labels for placement along the edge. The wireless communication device may include an RFID inlay. The label may be placed such that the RFID inlay may be located between the one or more layers of fabric and one of a label base or an RFID inlay substrate. The method may include encoding the RFID inlay. The encoding step may occur before completion of the stitching step.

In some embodiments, an apparatus for inserting a wireless communication device into a seam for a garment may include means for supporting at least one label, where each label may include an RFID inlay. The apparatus may include means for advancing a leading label onto an edge of one or more layers of fabric, and an RFID encoder. The plurality of labels may include a roll of labels and the means for supporting may include a pin, rod, or bar. The apparatus may include means for separating individual labels from the roll of labels. The plurality of labels may include a stack of labels and the means for supporting may include a tray.

According to some embodiments, an apparatus for inserting a wireless communication device into stitching such as a seam of for use in garments includes means for supporting a plurality of labels, each label comprising an RFID inlay, means for advancing a leading label onto an edge of one or more layers of fabric, and an RFID encoder. In some embodiments, the plurality of labels comprises a roll of labels and the means for supporting comprises a pin, rod, or bar. In some embodiments, the apparatus further comprises means for separating individual labels from the roll of labels. The means for separating may be one or more of a blade, an ultrasonic cutter, or a hot knife. In some embodiments, the plurality of labels comprises a stack of labels and the means for supporting comprises a tray.

According to some embodiments, a method for inserting a wireless communication device into stitching such as a seam comprises placing a label along an edge of one or more layers of fabric, the label comprising a wireless communication device, and stitching along the edge to create a seam such that the label is contained within the seam. In some embodiments, the label is one of a plurality of labels contained on a roll of labels and the placing step comprises advancing a leading label of the plurality of labels from the roll of labels for placement along the edge. In some embodiments, the method further comprises separating the leading label from the roll of labels. The separating step may occur before the stitching step has begun or may occur during the stitching step. In some embodiments, the label is one of a plurality of labels contained in a stack of labels and the placing step comprises advancing a leading label of the plurality of labels from the stack of labels for placement along the edge. In some embodiments, the wireless communication device comprises an RFID inlay. In some embodiments, the label is placed such that the RFID inlay is located between the one or more layers of fabric and one of a label base or an RFID inlay substrate. In some embodiments, the method further comprises encoding the RFID inlay. In some embodiments, encoding may occur before completion of the stitching step, or after completion of the stitching step. In some embodiments, encoding may occur before the stitching step has begun. In some embodiments, stitching comprises performing an overlock stitch. In some embodiments, the method further comprises cutting an outermost portion of the edge of the one or more layers of fabric during the stitching step.

According to some embodiments, a system for inserting a wireless communication device into stitching such as a seam comprises an overlock machine and a guide system configured to place a label along an edge of one or more layers of fabric, the label comprising a wireless communication device. In some embodiments, the guide system comprises means for supporting a plurality of labels, each label comprising a wireless communication device, and means for advancing one label at a time for placement onto the edge of the one or more layers of fabric. In some embodiments, the plurality of labels comprises a roll of labels and the means for supporting comprises a pin, rod, or bar. In some embodiments, the guide system further comprises means for separating individual labels from the roll of labels. In some embodiments, the means for separating comprises one or more of a blade, an ultrasonic cutter, or a hot knife. In some embodiments, the plurality of labels comprises a stack of labels and the means for supporting comprises a tray. In some embodiments, the system further comprises an RFID encoder. In some embodiments, the RFID encoder is part of an encoding station located on the guide system. In some embodiments, the system further comprises processing means and one or more databases.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to the figures, various aspects related to a method, system, and apparatus for inserting a label with integrated radio frequency identification (RFID) capabilities are shown and described. In some exemplary embodiments, an overlock machine (also referred to as an "overlocker" or as a "serger") having a guide system, as shown and described herein, is used to place labels having integrated RFID capabilities along an edge of one or more layers of fabric. An overlock stitch can then be made around the label to secure the same therein along the finished edge of the stitched fabric item. In this manner, the label having a wireless communication device may be automatically inserted using an overlock machine modified to include a guide system.

As discussed further herein, guide systems according to various embodiments of the present disclosure are configured to insert and encode labels having wireless communication devices during a stitching process, for example, when overlocking an edge, hem, or seam. Advantageously, no additional steps are needed when constructing/finishing a garment to add and/or encode the label having the wireless communication device, saving time and money. Moreover, by inserting the label into the seam or other stitched area, it will be hidden from consumers. This may have one or more of many advantages: it may not detract from the visual appeal of the item to which it is attached; it may reduce potential discomfort to a wearer/user of the item (for example, as compared to traditional garment labels, which may be attached at the neck of a shirt, or in the waistband of a skirt or pair of pants); it will prevent removal of the label (both because it will be difficult to remove without deconstructing or otherwise damaging the item to which it is attached, and because a consumer may not be aware of its presence), which keeps it associated with the item for the life of the item.

By making it more difficult to remove a label from an item without deconstructing or otherwise damaging the item, consumers and other interested parties can access product information throughout the life of the item. For example, a consumer may be able to access care instructions, information on the product's origins, or any other useful product information (e.g., with respect to an apparel item, recommendations on what to wear with it, and/or how to style it). Likewise, a consumer or other interested party, can obtain information from the label on how to recycle properly the item, and/or component parts thereof. Moreover, inserting the label in the seam can aid in security and loss prevention since a would-be-thief may not know of its presence, and would not be able to remove it without damaging the item even if he or she knew of the label's presence. In addition, the label can be used by the consumer to potentially order a replacement garment, once the original garment wears out.

Figure 1A:
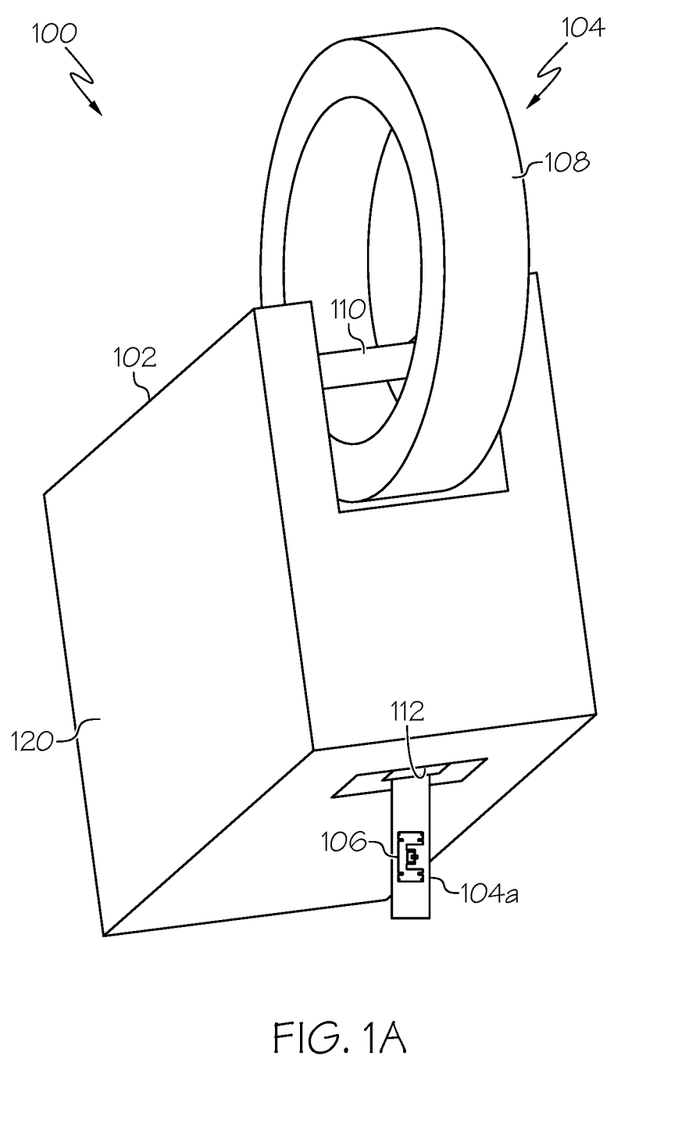
FIG. 1A illustrates an apparatus for inserting a wireless communication device into a seam according to some embodiments.
Figure 1B:
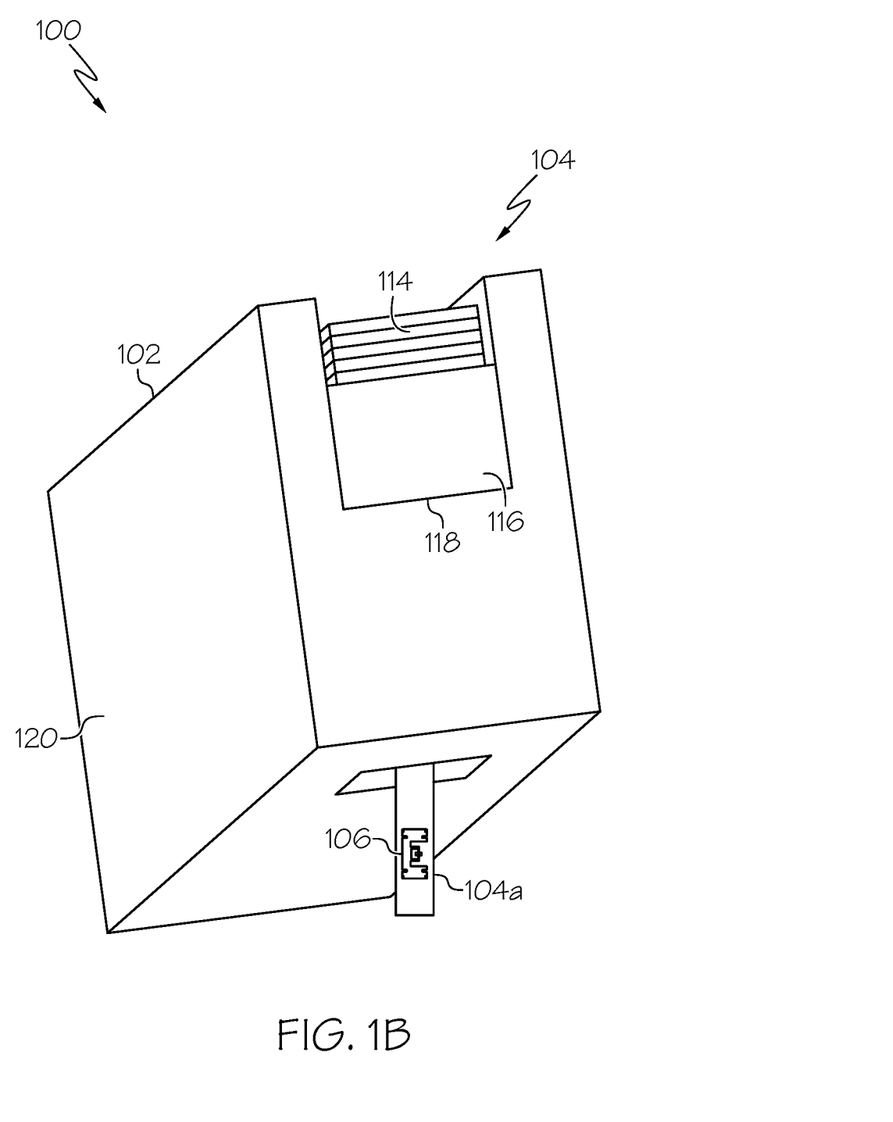
FIG. 1B illustrates an apparatus for inserting a wireless communication device into a seam according to some embodiments.

With reference to FIGS. 1A and 1B, an apparatus for inserting a wireless communication device into a seam is shown. As illustrated, the apparatus 100 comprises a guide system 102 that can be used with other machines and components, as discussed further herein. In use, the guide system 102 inserts a label, such as a woven label, having a wireless communication device attached thereto into a fabric seam. As used herein, the term "seam" may refer to any finished edge, hem, stitched area, or seam, including, but not limited to, a finished edge and/or non-edge portion of a single layer of fabric, a finished edge of a single layer of fabric that has been turned under and sewn, and a finished edge where two or more layers of fabric have been joined together.

In some embodiments, labels for use with the disclosed guide system 102 comprise labels having integrated RFID capabilities. For example, such labels may comprise an optional label base and an RFID inlay. The RFID inlay may comprise an RFID inlay substrate, an RFID antenna, and an integrated circuit (also referred to as an "IC" or "RFID chip" or "chip"). In some embodiments, one or both of the label base and the RFID inlay substrate may be a soft and/or flexible material, such as a fabric, paper, cardboard, flexible plastic, rubber, or other flexible material. Types of fabric that may be used may include one or more layers of and/or one or more blends of: canvas, cashmere, chenille, chiffon, cotton, crepe, damask, Georgette, Gingham, jersey, lace, leather, merino wool, modal, muslin, organza, polyester, satin, silk, spandex, suede, taffeta, toile, tweed, twill, velvet, viscose, and rayon.

Use of a soft/flexible substrate (as opposed to a more firm or rigid material, such as a rigid plastic material) may allow the label to be less noticeable when inserted into a seam. For example, a soft/flexible label base and/or RFID inlay substrate will be capable of bending and folding with the item to which it is attached, whereas a hard or rigid material may be felt in the seam should the item bend or fold. In some embodiments, the label base and/or RFID inlay substrate are made from a paper material that is recycled and/or is recyclable. In some embodiments, the label base and/or RFID inlay substrate are made from a fabric material that is a woven or non-woven fabric. The fabric material may be any natural or synthetic material and may be recycled and/or recyclable.

In some embodiments, use of a rigid material for a label may provide greater durability. In some embodiments, rigid and/or flexible materials for a label may be used in locations on clothing articles where rigid and/or flexible but more stiff items already exist, such as buttons, zippers, layered seams, buckles, patches, pockets, hemlines, bands, belts, folds, corners, creases, or indentations. In some embodiments, the rigid and/or flexible materials for a label may be used in places where the user is less likely feel or be bothered by the presence of the label. For example, the label may be disposed at least partially on, at least partially embedded within, at least partially placed between layers of, at least partially disposed underneath, or near a material and/or location that is stiffer and/or has greater or otherwise sufficient thickness to reduce label noticeability. Near may be defined as having at least part of the label within 1 mm, 2 mm, 3 mm, 4 mm, 5 mm, 6 mm, 7 mm, 8 mm, 9 mm, 10 mm, 15 mm, or 20 mm.

For example, the label may be disposed at least partially on, at least partially underneath, at least partially between layers of, or at least partially embedded within a layer of leather, foam, vinyl, metal, plastic, or other material used in an article of clothing. Articles of clothing may include shirts, jackets, pants, hats, shoes, sandals, boots, belts, ties, shorts, eyeglasses, goggles, jewelry, bags, backpacks, scarves, gloves, mittens, or other items. Other items where such labels may be used may include any commercial product having stitching, fabric, such as chairs, couches, car upholstery, wheelchairs, strollers, towels, blankets, sheets, mattresses, bed frames, or other items.

The RFID antenna may be any suitable structure known to those of ordinary skill in the art. For example, the RFID antenna may be provided as a conductive ink printed on the RFID inlay substrate, may be provided as conductive threads woven, stitched, or sewn into the RFID inlay substrate, or may be a conductive foil (formed according to methods known in the art) adhered or laminated to the RFID inlay substrate. The RFID antenna is coupled to the integrated circuit according to any suitable method known by those of ordinary skill in the art.

The RFID inlay may be configured to function in one or more frequency bands, such as low frequency (LF), high frequency (HF), or ultra-high frequency (UHF), as known to a person of ordinary skill in the art. In some embodiments, the RFID inlay may be configured to operate at specific frequencies in one or more bands. For example, the RFID inlay may operate within the HF spectrum at 13.56 MHz, and may thus be capable of interacting with near-field communication (NFC)-enabled devices (including smartphones) to provide a level of consumer engagement with the manufacturer or other marketers.

The RFID inlay may be secured to the label base by any suitable means, including, for example, with an adhesive layer disposed between the RFID inlay and the label base, or by sewing the RFID inlay to the label base. In some embodiments, such labels are provided in a roll format, and in others may be provided as individual labels. Specific details related to the various embodiments of the labels for use with the guide system 102 of the present disclosure are discussed further in U.S. patent application Publication Ser. No. 16/717,133 the entire disclosure of which, except for any definitions inconsistent with those contained herein, disclaimers, disavowals, and inconsistencies, is incorporated herein by reference.

In some embodiments, the guide system 102 comprises means for supporting one or more of a plurality of labels 104, each label comprising an RFID inlay 106. As shown in FIG. 1A, one or more of a plurality of labels 104 may be provided in a channel 108, which may include one or more of a roll, a tube, a rail, a frame, and a slide that defines and/or supports a channel formed within the structure. The channel 108 may be at least partially enclosed, such as the center opening within a straw, or it may be at least partially uncovered such as for a slide having a supporting slide surface, lateral guide walls, and an open top area.

The guide system 102 may include a pin, rod, bar, or other similar structure 110 for supporting the channel 108. In this manner, the channel 108 may be incrementally unwound to advance a leading label 104a for placement along an edge of one or more layers of fabric, as discussed further herein. In such embodiments, guide system 102 may also have means for separating leading label 104a from the channel 108. As shown in FIG. 1A, in some embodiments, a blade 112 may be provided for separating leading label 104a from the channel 108. According to other embodiments, any other cutting mechanism, such as an ultrasonic cutter, a hot knife, or other suitable means may be provided for separating leading label 104*a* from the channel 108.

In some embodiments, no cutting mechanism is needed to separate the label 104*a* from the channel 108. For example, the channel 108 may contain only a single label 104*a*. In other embodiments, the labels 104*a* may have precut, notched, or otherwise easily separated connecting edges with preceding and following labels. Alternatively, in some embodiments such as shown in FIG. 1B, one or more of a plurality of labels 104 may be provided in a stack 114. In such embodiments, the guide system 102 may include a tray 116 or any other suitable receptacle for supporting the stack 114 of labels. In this manner, a leading label 104*a* may be fed from the stack 114 for placement at a target location, such as along an edge of one or more layers of fabric, as discussed further herein. Leading label 104*a* may be fed from either the top of the stack 114 or from the bottom of the stack 114. For example, a bottom surface 118 of the tray may be configured to incrementally raise up, such that the depth of the tray 116 becomes progressively shallower, after each label 104 is fed onto the fabric edge. Thus, the bottom surface 118 pushes the stack 114 of labels up, so that the leading label 104*a* is better positioned to be fed from the stack 114, for example in conjunction with a roller, gripper, pusher, clamp, or other suitable mechanism (not illustrated), and onto the fabric edge.

In some embodiments, tray 116 may be configured to feed labels from a bottom portion thereof. For example, a slit or other similar opening (not illustrated) may be contained near a bottom surface 118 of the tray 116, out of which a leading label 104*a* (in this instance being contained at the bottom of the stack 114) may be fed for placement onto the fabric edge. In some embodiments, the tray 116 acts as a guide for delivery and feeding of a single label. In some embodiments, the tray 116 may be shorter than a label, which may extend from an entrance opening when first inserted before it is drawn into a material where it is added and attached through stitching. In some embodiments, a roller, gripper, pusher, clamp, or other suitable mechanism (not illustrated) may be used to feed leading label 104*a* from the stack 114.

According to some embodiments of the present discloser, apparatus 100 further comprises an RFID encoder 120, which may also be referred to generally as an RFID printer, an RFID reader, or an RFID writer/encoder. RFID encoder 120 is configured to read and/or write information onto RFID inlay 106, as would be appreciate by a person of ordinary skill in the art.

Figure 2:
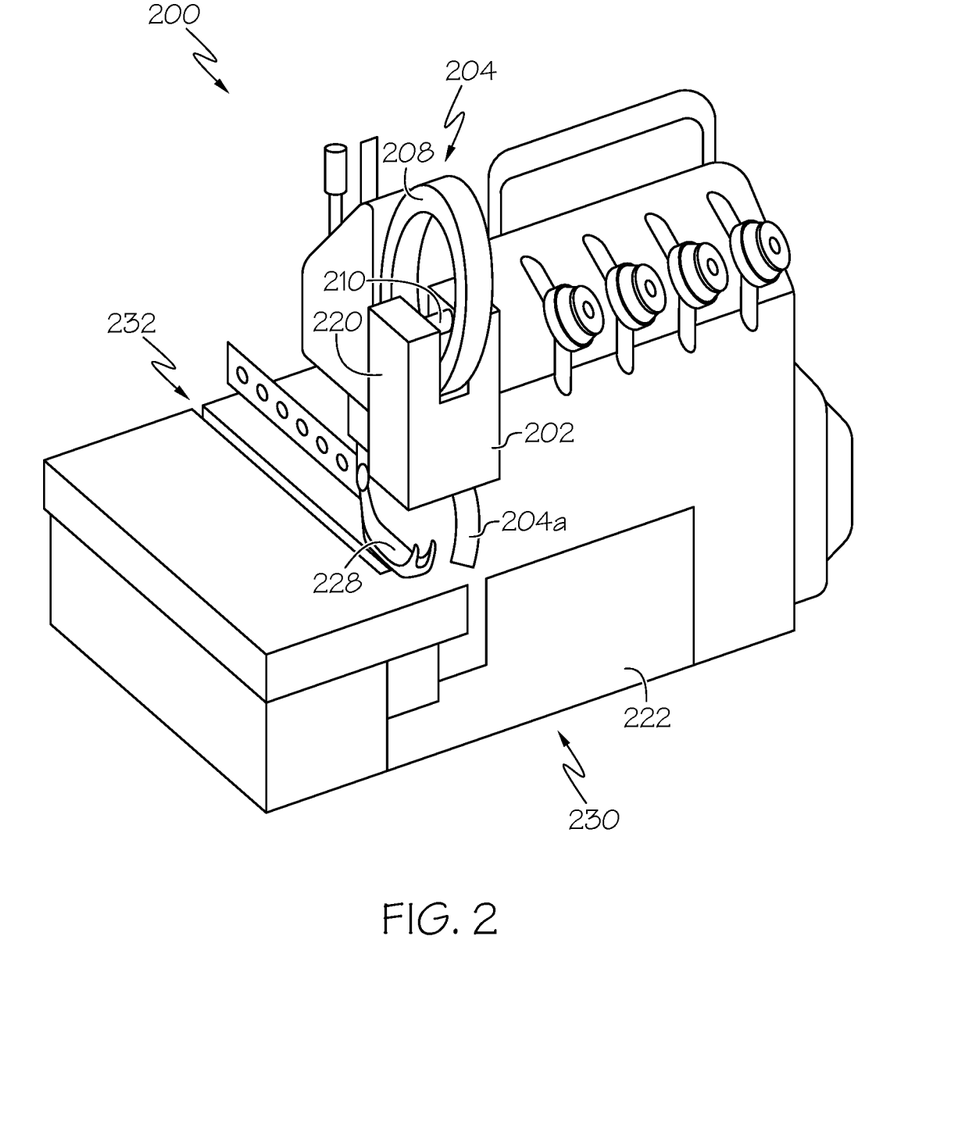
FIG. 2 illustrates a system for inserting a wireless communication device into a seam.

Some embodiments include a system 200 for inserting a wireless communication device into a seam is shown and described. As shown in FIG. 2, system 200 may include a guide system 202 and an overlock machine 222. In various embodiments, the overlock machine may be configured in one or more of a 1, 2, 3, 4, 5, 6, 7, 8, 9, 10 or greater thread formation. Each of the different types of machines may provide advantages with respect to the stitching pattern created.

A 1 thread overlock machine configuration may be useful for end to end seaming or butt-seaming of piece goods. A 2 thread overlock machine configuration may provide benefits with respect to edging on seaming, such as for knits and wovens, finishing seam edges, stitching flatlock seams, and hemming. A 3 thread overlock machine configuration may be useful for sewing pintucks, creating narrow rolled hems, finishing fabric edges, decorative edging, and seaming knit or woven fabrics. A 4 thread overlock machine configuration may be useful for decorative edging. A 5 thread overlock machine configuration may be useful for creating safety stitches utilizing two needles. Greater numbers of thread overlock machine configuration may provide increasing security with respect to stitching.

Guide system 202 may be configured similarly to or the same as the embodiments of the guide system 102 shown and described with respect to FIGS. 1A and 1B. For example, guide system 202 may comprise means for supporting a plurality of labels 204, each label comprising an RFID inlay. As shown in FIG. 2, a plurality of labels 204 is provided in a channel 208 and the guide system 202 may include a pin, rod, bar, or other similar structure 210 for supporting the channel 208. In this manner, the channel 208 may be incrementally unwound to advance a leading label 204*a* for placement along an edge of one or more layers of fabric, as discussed further herein.

In some embodiments, guide system 202 may also have means for separating leading label 204*a* from the channel 208. In some embodiments, a blade is provided for separating leading label 204*a* from the channel 208. According to other embodiments, any other cutting mechanism, such as an ultrasonic cutter, a hot knife, mechanical cutter, rotary knife, or other suitable means may be provided for separating leading label 204*a* from the channel 208.

In some embodiments, no cutting mechanism is needed to separate the label 204*a* from the channel 208. For example, the channel 208 may contain only a single label 204*a*. In other embodiments, the label 204*a* may have precut, notched, or otherwise easily separated connecting edges with preceding and following labels. Alternatively, in some embodiments such as shown in FIG. 1B, one or more of a plurality of labels may be provided in a stack. According to such embodiments, the tray may be configured as described elsewhere herein to feed a leading label 204*a* along an edge of one or more layers of fabric.

With continued reference to FIG. 2, guide system 202 may be placed on or near overlock machine 222 in such a manner so that leading label 204*a* is fed under presser foot 228 of overlock machine with the one or more layers of fabric from a front side 230 to a rear side 232 of the overlock machine 222. As the leading label 204*a* is fed through overlock machine 222, it may be contained at least partially within the overlock stitch along the edge of the one or more layers of fabric.

Figure 3:
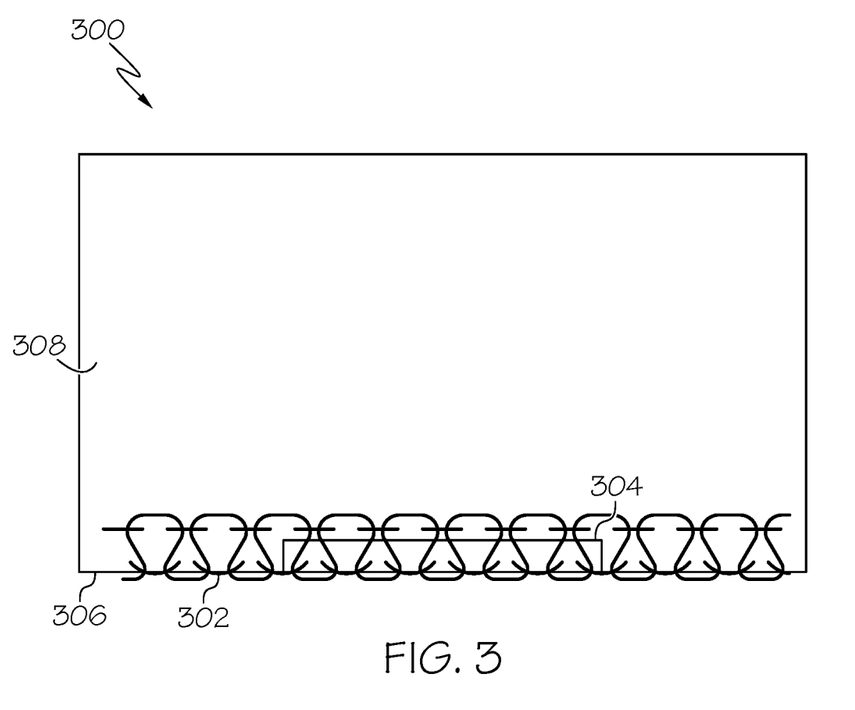
FIG. 3 illustrates an item including a label with integrated RFID capabilities.

As shown in FIG. 3, for example, item 300 includes a label 304 with integrated RFID capabilities contained within and secured by overlock stitch 302, which runs along an edge 306 of the one or more layers of material 308 (e.g., fabric, plastic, cloth, paper, cardboard, rubber). In some embodiments, a width of the label 304 is equal to or less than the desired width of the overlock stitch 302. In some embodiments, the label 304 width is between approximately 3.5 mm and approximately 7 mm. In other embodiments, the label 304 width is between approximately 4 mm and approximately 6.5 mm. In still further embodiments, the label 304 width is between approximately 4.5 mm and approximately 6 mm. In a preferred embodiment, the label 304 width is approximately 5 mm. For example, the label 304 width may be within 0.1, 0.2, 0.3, 0.5, 0.7, 0.9, 1.0, 1.3, 1.6, 1.75, 2, or 2.5 mm.

A length of the label 304 may vary based on specific design parameters and other such considerations but may be between approximately 25 mm and approximately 100 mm. In some embodiments, the label 304 length may be between approximately 50 mm and approximately 75 mm. In a preferred embodiment, the label 304 length may be approximately 65 mm. Any other suitable label 304 width and/or length may be used without departing from the scope of the invention, including any width that may be wider than the desired or actual stitch width.

When a leading label 204a is fed from a front side 230 to a rear side 232 of overlock machine 222, as pictured in FIG. 2, the guide system 202 may be placed to not obstruct the view of, or otherwise impede the workflow of, an operator using the overlock machine 222 and system 200 described herein. For example, the system 200 may be small enough to be attached to the presser foot 228. In some embodiments, the system 200 may be an elongate member that extends outward from the rear of the overlock machine 222, such as towards a presumed position for an operator of the overlock machine 222, at an angle between horizontal and vertical. The angle may be between 0 and 10 degrees, 5 and 30 degrees, 10 and 45 degrees, 20 and 55 degrees, 25 and 65 degrees, or 30 and 75 degrees from horizontal.

In some embodiments (not illustrated), it may be advantageous to place the guide system on or near overlock machine 222 in such a manner so that leading label 204 is located on the rear side 232. A person of ordinary skill in the art will appreciate, however, that such embodiments may be limited to overlock machines 222 capable of both forward and reverse sewing. For example, in some embodiments, guide system 202 is configured to place leading label 204a along the edge of one or more layers of fabric that have already been overlocked. Once the label 204a has been placed along the overlocked edge, the overlock machine 222 may be set to operate in a reverse direction. In other words, the overlock machine 222 may sew (or re-sew) the one or more layers of fabric as they are fed from the rear side 232 to the front side 230 of the overlock machine 222. Thus, as the leading label 204a is fed under the presser foot 228 with the one or more layers of fabric in a reverse manner, the leading label 204a will be at least partially contained within and secured by the overlock stitch along the edge. Once the leading label 204a has been secured by and within the overlock stitch, the overlock machine 222 can be set to operate in a forward direction and overlocking of the fabric item may continue.

In various embodiments, this may create a structure of layers of overlock stitches. For example, in some embodiments, at least some of the layers in order may include a material layer, a label on the material layer, and an overlock stitch over the label. In some embodiments, at least some of the layers in order may include a material, an overlock stitch layer on the material, a label on the overlock stitch layer, an additional overlock stitch layer holding the label down on the other layers. Additional layers may be placed below and/or above the label to secure the material and/or the label. In some instances, two overlock stitch layers may be placed over the label for greater security and because the machine was used in both a forward and reverse direction. Additional passes may be used to apply additional overlock threads to the structure.

As shown in FIG. 2, system 100 may further include an RFID encoder 220. As illustrated, RFID encoder 220 may be part of an encoding station located on the guide system 202. In other embodiments (not illustrated), RFID encoder 220 may be a separate component of system 100, and may be placed on overlock machine 222 or guide system 202, or otherwise placed in proximity to overlock machine 222 and guide system 202 within a read/write range of RFID inlays located on labels 204.

According to some embodiments, the system may further comprise processing means for controlling the RFID encoder. In some embodiments, the processing means may comprise one or more general or special purpose computers. Such general or special purpose computers may take any form including, for example, a PC or desktop computer, or a mobile computing device, including a smartphone or tablet. In some embodiments, the processing means are in communication with one or more databases having information, values, or other attributes stored thereon that are to be encoded by RFID encoder 220 on an RFID inlay. In some embodiments, the processing means are in communication with one or more databases into which information, values, or other attributes read from RFID inlay are stored.

According to some aspects of the present disclosure, a method for inserting a wireless communication device into a seam is provided. In some embodiments, a label comprising a wireless communication device is placed along an edge of one or more layers of fabric. For example, a guide system according to the embodiments described elsewhere herein may be used to place the label along the edge. In some embodiments, the method further comprises stitching along the edge to create a seam such that the woven device is contained within the seam. A person of ordinary skill in the art will understand that such stitching along the edge may create any finished edge, hem, seam, or other similar structure as known to those skilled in the art.

In some embodiments, the label is one of a plurality of labels and the guide system controls advancement of one label at a time for insertion into the seam. As discussed herein, the plurality of labels may be contained on a roll of labels. In such embodiments, a leading label (i.e., a first label) contained on the roll may be advanced for placement along the edge of the one or more layers of fabric and the leading label is separated from the roll. For example, the guide system may unroll the roll so that a single label is placed in the desired location along the edge, and cutting means sever the label from the roll.

In some embodiments, the leading label is separated from the roll prior to being placed along the edge. In other embodiments, separation may occur during or after placement of the leading label along the edge. In some embodiments, the leading label is separated from the roll of labels by cutting the leading label from the roll using a blade, knife, or any other suitable cutting mechanism as understood by a person of ordinary skill in the art and discussed elsewhere herein.

In some embodiments, the leading label is separated from the roll before stitching has begun or before any stitching over and/or around the leading label has begun. In other embodiments, the leading label is separated from the roll after stitching has begun or after stitching over and/or around the leading label has begun. In some embodiments, the leading label may be separated from the roll without ceasing the stitching. Advantageously, production of items having RFID labels inserted into a seam without a decrease, without any substantial decrease, to production times required for production of similar items without such RFID labels. In some embodiments, however, a stitching process could be temporarily stopped while a leading label is separated from a roll of labels and/or placed along the edge of the one or more layers of fabric.

In some embodiments, as discussed elsewhere herein, the plurality of labels may be provided in a stack of labels. In such embodiments, a leading label (i.e., a first label) contained in the stack is fed from the stack, which in some embodiments may be supported by a tray or other suitable receptacle, for placement along the edge of the one or more layers of fabric. In some embodiments, leading label is contained at the top of the stack of labels and means for placing the label along the fabric edge are provided. For example, a roller, gripper, pusher, clamp, or other suitable mechanism may be used with the systems described herein to feed leading label from the label stack onto the one or more layers of fabric along an edge portion thereof. In other embodiments, leading label is contained at the bottom of the stack of labels. In such embodiments, a bottom of the tray or other receptacle that supports the label stack contains a slit or other similar opening near a bottom surface thereof. A roller, gripper, pusher, clamp, or other suitable mechanism may be used to pull the leading label from the bottom of the stack, and to feed the label to the edge of the one or more layers of fabric.

In some embodiments, a label is held on the edge of the one or more layers of fabric before and during stitching by frictional forces. For example, frictional forces between the label base and the top layer of the one or more layers of fabric are enough to retain the label in a desired location while a stitching process is performed. In some embodiments, one side of the label may have an adhesive to aid in retention of the label on the one or more layers of fabric before and during stitching. For example, the label base may have an adhesive (such as a pressure sensitive adhesive) on a rear surface thereof, and in some embodiments a releasable backing is attached to the rear surface. In some embodiments, an adhesive layer is applied to a top surface of the label, and a releasable backing may be attached thereto. In some embodiments, a top surface of the label may also be a top surface of the RFID inlay. In such embodiments, such a configuration advantageously protects the RFID inlays from damage during storage, shipment, etc., of the labels. Prior to placement of the label along the edge of the one or more fabric layers, the releasable backing may be removed to expose the adhesive layer (located on either a rear surface or a top surface of the label). The guide system may be configured to remove the releasable backing from the label before placing the label along the edge of the one or more layers of fabric. Alternatively, the guide system may be configured to deposit an adhesive on a surface of one or both of the label or the one or more layers of fabric to aid in retention of the label on the fabric before and during stitching.

In some embodiments, the label may be placed "face down" on the one or more layers of fabric so that the active components (RFID antenna and integrated circuit) are located between the inlay substrate and the one or more layers of fabric. Advantageously, this may protect the active components of the RFID inlay to prevent damage thereto, thus ensuring optimal performance of the RFID inlay throughout the life of the item into which it is inserted. Alternatively, the RFID inlay may be placed "face up" on the garment.

According to some embodiments, the wireless communication device of the label comprises an RFID inlay. In such embodiments, methods of the present disclosure may further comprise encoding the RFID inlay. RFID inlay may be encoded with any data as desired for the particular application limited only by technical considerations, such as memory available on the RFID inlay itself. The RFID inlay may be encoded at any suitable time without departing from the scope of the present disclosure. For example, the RFID inlay may have been encoded when the inlay was initially produced or when the inlay was joined with the label substrate to form the labels for insertion into the fabric seam. In other embodiments, the RFID inlay is encoded after stitching of the fabric item has been completed. For example, with the production of a garment, the label with RFID inlay may be inserted into a seam of the garment and additional production and processing steps necessary to finish the garment may be completed before the RFID inlay is encoded. Advantageously, however, the RFID inlay may be encoded during stitching of the fabric item using an encoder provided with the systems contemplated herein. Thus, a label having an RFID inlay may be encoded on demand and automatically inserted into a seam of a fabric item, such as a garment or other apparel item. By encoding the RFID label during stitching of, e.g., a garment, a separate encoding step (either prior to or subsequent to the production of the garment) can be eliminated.

The foregoing description and accompanying figures illustrate some of the principles, embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by persons skilled in the art without departing from the scope of the invention as defined by the following claims.

What is claimed is:

1. A system for inserting a wireless communication device into a seam, comprising:
    an overlock machine; and
    an RFID encoder located within a read/write range of labels, wherein a label comprises a wireless communication device and a wireless communication device comprises an RFID inlay, the RFID encoder configured to encode the RFID inlays of the labels;
    a guide system configured to feed at least one of the labels comprising an encoded RFID inlay, into an edge region being of one or more layers of material being stitched by the overlock machine such that the label is contained within and secured by the stitch.

2. The system of claim 1, wherein the guide system comprises a channel for supporting at least one label.

3. The system of claim 1, where the guide system includes means for supporting a roll of labels, and the means for supporting comprises a pin, rod, or bar.

4. The system of claim 1, where the guide system comprises means for separating individual labels from other labels.

5. The system of claim 1, where the guide system comprises means for supporting a stack of labels and the means for supporting comprises a tray.

6. The system of claim 1, where the RFID encoder is part of an encoding station located on the guide system.

7. The system of claim 1, further comprising processing means and one or more databases.

8. A method for inserting a wireless communication device into a seam, comprising:
    encoding, by an RFID encoder located within a read/write range of labels, an RFID inlay, wherein a label comprises a wireless communication device and a wireless communication device comprises an RFID inlay;
    placing the label comprising the encoded RFID inlay into an edge region of one or more layers of materials to be stitched; and
    using an overlocking machine to stitch the edge region of one or more layers of the material to create a seam binding the label to the material such that the label is contained within and secured by the stitch.

9. The method of claim 8, where the label is one of a plurality of labels contained on a roll of labels and the placing step comprises advancing a leading label of the plurality of labels from the roll of labels for placement along the edge.

10. The method of claim 9, further comprising separating the leading label from the roll of labels.

11. The method of claim 8, wherein the label is one of a plurality of labels contained in a stack of labels and the placing step comprises advancing a leading label of the plurality of labels from the stack of labels for placement along the edge.

12. The method of claim 8, wherein the label is placed such that the RFID inlay is located between the one or more layers of material and one of a label base or an RFID inlay substrate.

13. The method of claim 8, where the encoding step occurs before completion of the stitching step.

14. An apparatus for inserting a wireless communication device into a seam for a garment, comprising:
   means for supporting at least one label, each label comprising an RFID inlay;
   means for advancing a leading label onto an edge of one or more layers of fabric to be stitched to create a seam, such that, when the one or more layers of fabric are stitched to create the seam, the label is contained within and secured by the stitch; and
   an RFID encoder.

15. The apparatus of claim 14, where the plurality of labels comprises a roll of labels and the means for supporting comprises a pin, rod, or bar.

16. The apparatus of claim 15, further comprising means for separating individual labels from the roll of labels.

17. The apparatus of claim 14, where the plurality of labels comprises a stack of labels and the means for supporting comprises a tray.

\* \* \* \* \*